Feb. 7, 1967 — K. CONRAD — 3,302,786
INSPECTING GLASS CONTAINERS WITH LASERS
Filed Sept. 29, 1964
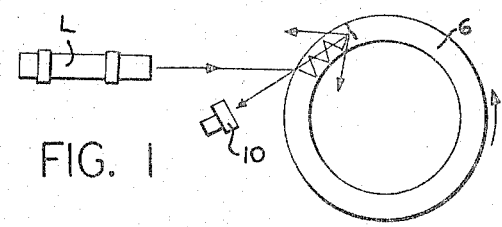
FIG. 1
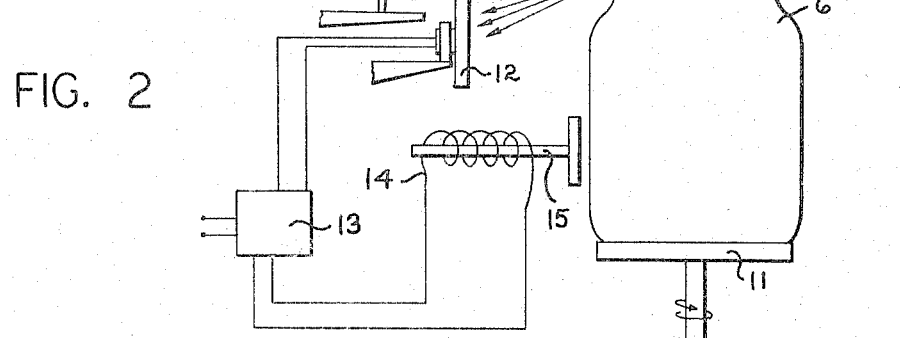
FIG. 2
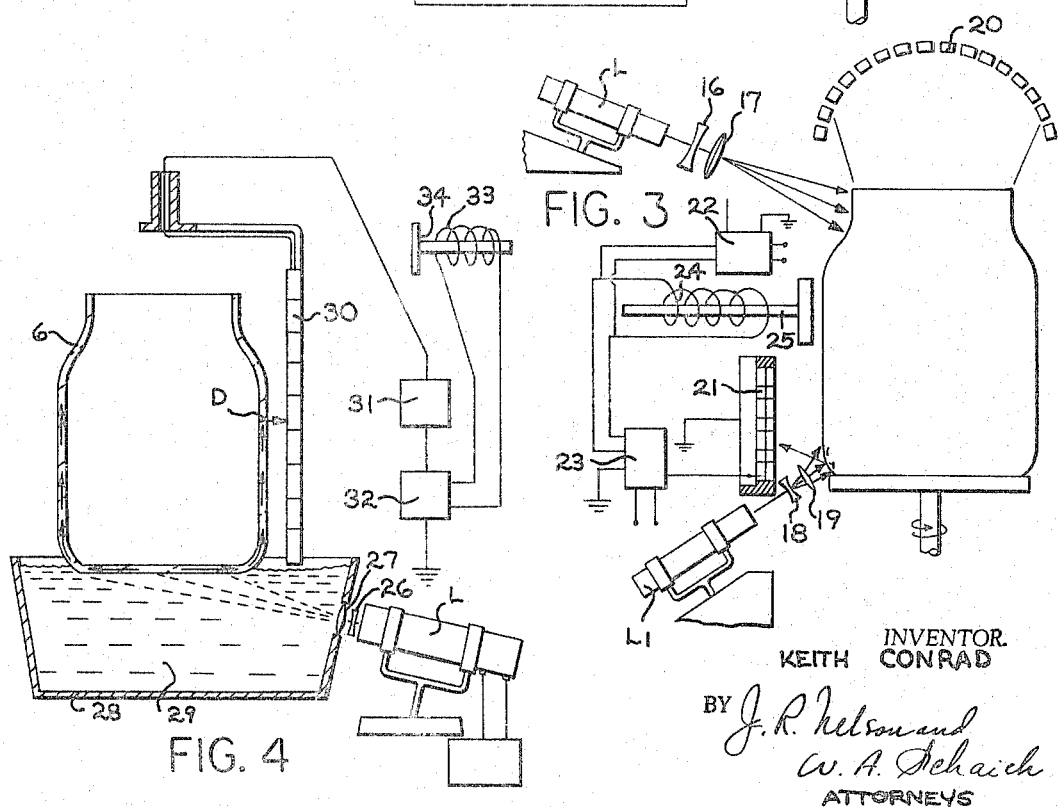
FIG. 3
FIG. 4
INVENTOR.
KEITH CONRAD
BY J. R. Nelson and
W. A. Schaich
ATTORNEYS 3,302,786
INSPECTING GLASS CONTAINERS WITH LASERS
Keith Conrad, Toledo, Ohio, assignor to Owens-Illinois, Inc., a corporation of Ohio
Filed Sept. 29, 1964, Ser. No. 400,104
4 Claims. (Cl. 209—111.5)

This invention relates to inspecting glass containers for defects and particularly for defects such as checks and the like.

A common defect found in the wall of glass containers is that conventionally known as a check, namely, a mirror-like defect. Another type defect comprises an elongated blister. It has heretofore been suggested that such defects may be detected by directing a beam of light properly oriented against the defect and causing the defect to redirect a portion of the light to a light sensitive cell or the like.

A major problem in the detection of defects with conventional light is that extraneous light interferes with the detection of the defect and reduces the signal to noise ratio.

It is therefore an object of this invention to provide a method and apparatus for more efficiently detecting defects in glass containers.

Basically, the invention comprises utilizing a laser beam and directing the beam into the wall of the container. It has been found that the laser beam is internally reflected within the container wall and when the laser beam strikes a defect in the wall of a glass container, a portion of the laser beam is redirected and produces a sharp signal that can be readily detected, thereby resulting in a high signal to noise ratio.

In the drawings:

FIG. 1 is a diagrammatic plan view of an apparatus embodying the invention.

FIG. 2 is a diagrammatic side elevational view of another apparatus embodying the invention.

FIG. 3 is a diagrammatic side elevational view of another form of the apparatus.

FIG. 4 is a diagrammatic elevational view of a further modified form of the apparatus.

Referring to FIG. 1, the glass container G which is to be inspected is supported by suitable means for rotation about its axis. A source L of a laser beam is caused to direct the laser beam into the wall G of the container. When the laser beam strikes a defect, a portion of the laser beam is redirected outwardly and energizes a light sensitive cell 10 which then actuates a reject mechanism. It has been found that a satisfactory laser source L comprises a gas laser oscillator.

It has been found that defects produce a much more brilliant and intense redirection than when they are inspected for by use of conventional light. In addition, it has been found that the specific orientation of the light beam and sensitive cell with respect to the defect is not as critical when a laser beam is used as when a conventional beam is used. In addition, a much higher signal to noise ratio has been found.

In the apparatus shown in FIG. 2, the glass container G is mounted on a rotation pad 11 and a laser source L directs a beam against the rim of the container to inspect the rim. When a defect is present, a portion of the laser beam is directed against a sensitive cell 12 which produces an electrical signal that is amplified by an amplifier 13 and caused to energize a reject solenoid 14 and move a plunger 15 to reject the container.

In the form of the invention shown in FIG. 3, the source L produces a collimated beam which is then caused to diverge by lenses 16, 17 and illuminate a wide annular portion of the neck of the container. A second source L' produces a beam that is caused to diverge by lenses 18, 19 and illuminate a wide annular portion at the base of the container. A plurality of cells 20 sensitive to the laser beam are provided in an arcuate row above the neck of the container G and a plurality of cells 21 in a vertical array are provided adjacent the base of the container. If a portion of one of the laser beams is redirected by a defect, it strikes one of the cells 20 or 21 and produces an electrical signal which is amplified by suitable electronic devices 22 or 23 to energize a solenoid 24 and move a reject plunger 25 to reject the container.

In the form of the invention shown in FIG. 4, the source of the laser beam L is focused in a diverging path by lenses 26, 27 through a container 28 filled with a liquid 29 that has an index of the refraction substantially that of the glass of the container. The container G is supported and rotated in a manner not shown with the base thereof in contact with the liquid. A plurality of cells 30 are provided in a vertical array adjacent the wall of the container. The laser beam passing through the liquid into the container wall illuminates the container wall and when a defect D is present in the wall of the container, it redirects a portion of the laser beam to one of the cells. This produces an electrical signal which is then amplified by suitable electronic apparatus 31, 32 and caused to energize a solenoid 33 to operate a reject plunger 34 to reject the container.

Although I do not wish to be bound by the theory involved, in my opinion, the laser beam, being a collimated coherent light source, enters the walls of the glass container G and is redirected so that as the laser beam is reflected internally within the container wall, it has a more likely probability of contacting a defect and being redirected outside of the wall of the container. In addition, since the laser is at a predetermined known frequency which differs from that of normal light about the apparatus handling the glass container, the cells against which the redirected portion of the laser beam is directed can be made sensitive only to the laser beam radiation either by their inherent structure or by the use of appropriate filters.

I claim:
1. The method of inspecting glass containers for defects such as checks and the like which comprises
   directing a laser beam into the wall of the container in such a manner that a substantial portion of the wall of the container is illuminated by reflection of the laser beam internally within the wall of the container,
   causing a defect to redirect a portion of the laser beam out of the wall of the container,
   creating a signal in response to said redirected portion of the beam,
   and rejecting the container in response to said signal.

2. The method of inspecting glass containers for defects such as checks and the like which comprises
   supporting a glass container in a liquid medium having an index of refraction substantially the same as the glass of the container,
   directing a diverging laser beam into the wall of the container through said medium in such a manner that the wall of the container is illuminated by reflection of the laser beam internally within the wall of the container,
   causing a defect to redirect a portion of the laser beam out of the wall of the container,
   creating a signal in response to said redirected portion of the beam,
   and rejecting the container in response to said signal.

3. An apparatus for inspecting containers for defects such as checks or the like which comprises
   means for supporting the container, means for directing a laser beam into the wall of the container, sensitive means positioned externally of the wall of the container and responsive to energization by the laser beam whereby when a defect is in the path of the laser beam, a portion of the laser beam is directed out of the wall of the container and against the sensitive means, reject means responsive to the energization of said sensitive means for rejecting the container, and a liquid bath in which the walls of the container are positioned, said liquid having an index of refraction corresponding to that of glass, said laser beam being directed so that it passes through said liquid into the wall of said glass container.

4. An apparatus for inspecting open mouth containers for defects such as checks or the like which comprises means for supporting the container, means for directing a diverging laser beam into the wall of the container, and sensitive means positioned externally of the wall of the container and responsive to energization by the laser beam whereby when a defect is in the path of the laser beam, a portion of the laser beam is directed out of the wall of the container and against the sensitive means, reject means responsive to the energization of said sensitive means for rejecting the container, and a liquid bath in which the bottom wall of the container is positioned, said liquid having an index of refraction corresponding to that of glass, said laser being directed so that it passes through said liquid into the bottom wall of said glass container.

References Cited by the Examiner

UNITED STATES PATENTS

| 2,439,490 | 4/1948 | Schell. | |
| 2,902,151 | 9/1959 | Miles. | |
| 2,943,531 | 7/1960 | Bentley | 88—14 |
| 3,180,994 | 4/1965 | Rottmann | 88—14 |

OTHER REFERENCES

Measurement and Control; September 1963; p. 374.

M. HENSON WOOD, JR., *Primary Examiner.*

J. N. ERLICH, *Assistant Examiner.*